(12) United States Patent
Tsao

(10) Patent No.: US 8,708,533 B2
(45) Date of Patent: Apr. 29, 2014

(54) LIGHTING FIXTURE FOR BICYCLE

(71) Applicant: Shou Meng Enterprise Co., Ltd., Chang Hua County (TW)

(72) Inventor: Jung-Chou Tsao, Chang Hua County (TW)

(73) Assignee: Shou Meng Enterprise Co., Ltd., Chang Hua (TW)

( * ) Notice: Subject to any disclaimer, the term of this patent is extended or adjusted under 35 U.S.C. 154(b) by 0 days.

(21) Appl. No.: 13/691,621

(22) Filed: Nov. 30, 2012

(65) Prior Publication Data

US 2013/0141924 A1 Jun. 6, 2013

(30) Foreign Application Priority Data

Dec. 1, 2011 (TW) .............................. 100222705 A

(51) Int. Cl.
*F21V 7/00* (2006.01)
(52) U.S. Cl.
USPC ...... 362/297; 362/296.05; 362/346; 362/473; 362/517

(58) Field of Classification Search
USPC ................. 362/297, 296.05, 296.1, 341, 346, 362/473–475, 516–517, 460, 509, 518, 362/296.01, 342, 343
See application file for complete search history.

(56) References Cited

FOREIGN PATENT DOCUMENTS

GB            2190479 A   * 11/1987  ................ F21V 7/09

* cited by examiner

*Primary Examiner* — Donald Raleigh
(74) *Attorney, Agent, or Firm* — Muncy, Geissler, Olds & Lowe, P.C.

(57) ABSTRACT

A bicycle lighting fixture includes a housing defining therein an accommodation chamber, a reflector mounted in the accommodation chamber and a light source mounted in the accommodation chamber for emitting light onto the reflector. The reflector provides a curved reflecting surface facing toward the outside of the accommodation chamber and defining a plurality of reflecting surface areas at different elevations and a terrace surface connected between each two adjacent reflecting surface areas.

9 Claims, 6 Drawing Sheets

LIGHTING FIXTURE FOR BICYCLE

BACKGROUND OF THE INVENTION

1. Field of the Invention

The present invention relates to bicycle accessories and more particularly to a lighting fixture for use in a bicycle.

2. Description of the Related Art

A bicycle lighting fixture enhances bicycle riding safety. More particularly, when riding a bicycle at night, in a tunnel, or under an insufficient lighting environment, the lighting fixture on the bicycle provides lighting for enabling the bicycle rider to see the road condition and alerting vehicles in the opposing direction. In order to achieve the aforesaid targets, some countries and areas define standard regulations on bicycle lighting fixtures. Among them, German defines strict rules on bicycle lighting fixtures so thoroughly as to ensure a high level of safety. The related German standard is called "TA23" and it's found within StVZO (anything related road & traffic). Imagine a wall 10 m away from the light and 90 deg to the beam. The wall is at least 2.8 m wide and 2 m high and split into multiple measurement zones. The beam pattern seen on the wall will typically have a very bright spot in the middle and go darker to the left and right as well as down. The brightest spot has to be 10 Lux min. In the area above the hotspot, the intensity must not exceed 2 Lux as not to disturb oncoming traffic. Table I illustrates the related data.

TABLE I

| Unit: lx | −8° | −4° | 0° | 4° | 8° |
|---|---|---|---|---|---|
| >3.4° | | | <2 | | |
| 0° | | >50%[0°, 0°] | >20 | >50%[0°, 0°] | |
| −1.5° | | | >50%[0°, 0°] | | |
| −5° | >2 | >2 | >2.5 | >2 | >2 |

In order to meet the rules of StVZO "TA23", EP2157009 discloses a bicycle headlamp entitled "Bicycle headlamp with near field illumination and corresponding bicycle", as illustrated in FIG. 6, wherein the reflector (3) provides multiple reflecting surfaces of different curvatures at different locations so that the illumination of a specific luminous area meets the rules of StVZO "TA23".

This design of bicycle headlight has a light source with an irradiant reflector of the light source. A light disk of the reflector forms a light, which comprises a horizontal datum plane that is appropriate for vertically largest light intensity in a range. The reflector is formed such that the width of the light cone remains constant up to a range of 15 degrees below the horizontal datum plane. This design of the reflecting surfaces of the reflector complicates the design and fabrication of the shape-forming mold for reflector. In consequence, the fabrication of the reflector requires much labor and time, increasing the manufacturing cost.

SUMMARY OF THE INVENTION

The present invention has been accomplished under the circumstances in view. It is the main object of the present invention to provide a bicycle lighting fixture, which makes the design of the reflector to be more flexible and easy.

To achieve this and other objects of the present invention, a bicycle lighting fixture comprises a housing defining therein an accommodation chamber, a reflector mounted in the accommodation chamber, and a light source mounted in the accommodation chamber for emitting light onto the reflector. The reflector provides a curved reflecting surface. The curved reflecting surface faces toward the outside of the accommodation chamber, defining a plurality of reflecting surface areas disposed at different elevations and a terrace surface connected between each two adjacent reflecting surface areas.

Because the reflecting surface areas of the curved reflecting surface are of non-continuous multi-step design, the face shape design of the curved reflecting surface is simple, and the reflecting surface areas of the curved reflecting surface can reflect light onto the expected area. Preferably, the reflecting surface area at the top side is configured to reflect light onto a nearby place below the bicycle lighting fixture; the reflecting surface area at the bottom side is configured to reflect light onto a relative far place. Thus, reflecting surface areas at different elevations can satisfy different luminance requirements. Instead of continuous curvature variation, the invention has different reflecting surface areas of the curved reflecting curve be disposed at different elevations and connected together by respective terrace surfaces, facilitating the face shape design of the curved reflecting surface, enhancing face shape design flexibility, and saving much bicycle lighting fixture fabrication time, labor and cost.

DETAILED DESCRIPTION OF THE INVENTION

Figure 1:
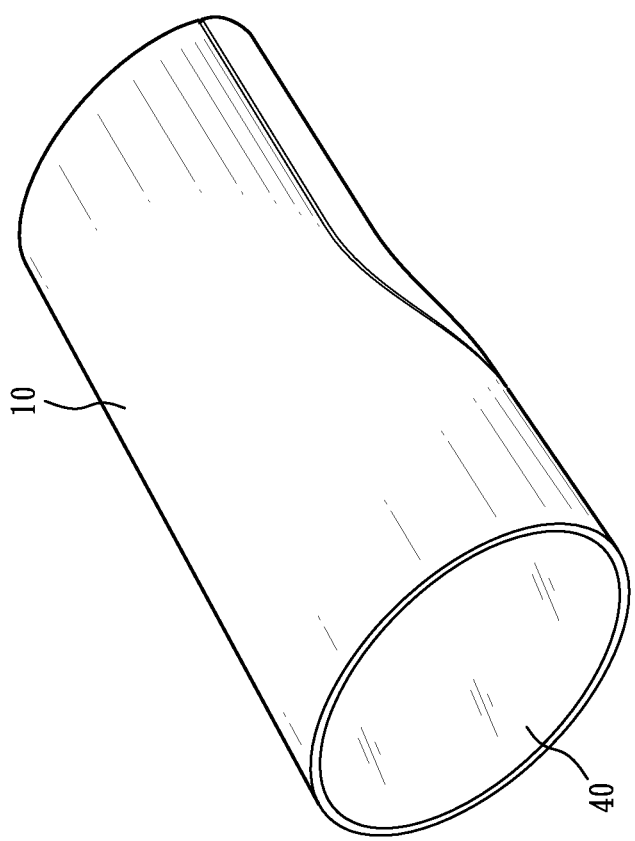
FIG. 1 is an elevational view of a bicycle lighting fixture in accordance with the present invention.
Figure 2:
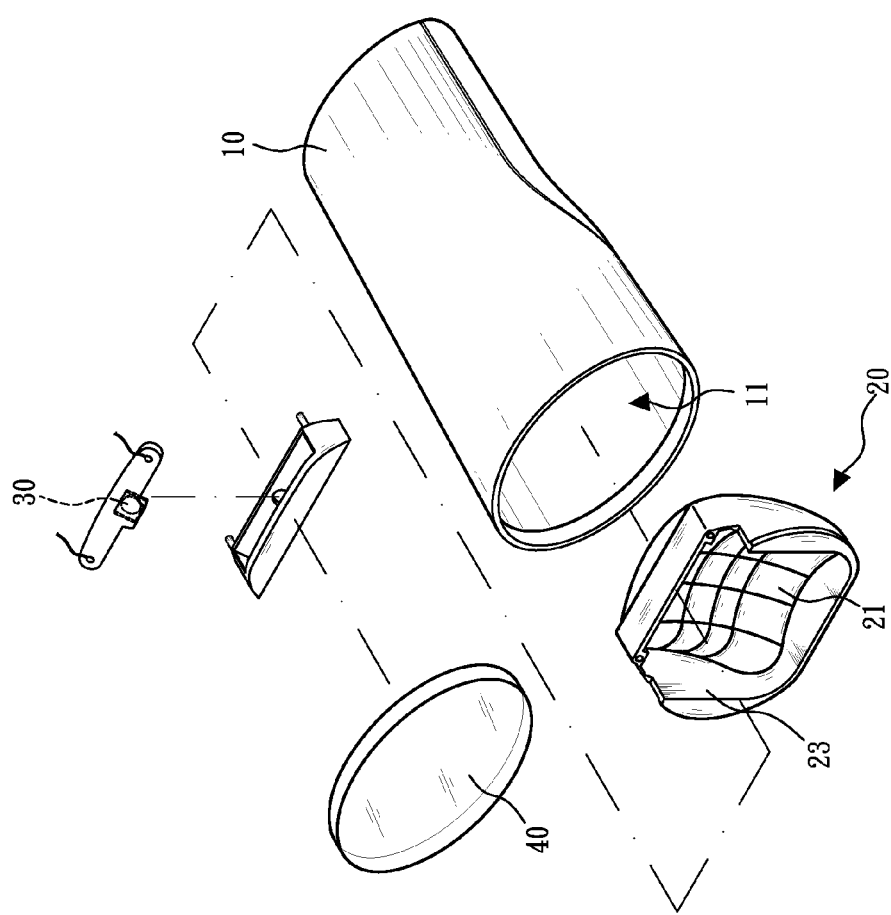
FIG. 2 is an exploded view of the bicycle lighting fixture in accordance with the present invention.
Figure 3:
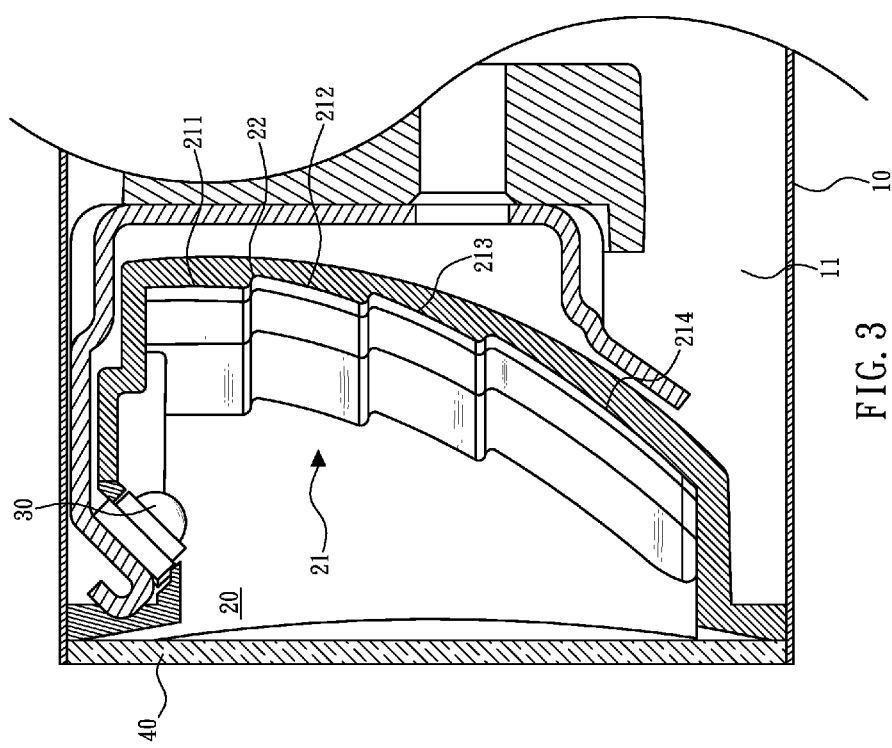
FIG. 3 is a schematic vertical section view, in an enlarged scale, of a part of the bicycle lighting fixture in accordance with the present invention.

Referring to FIGS. 1-3, a bicycle lighting fixture in accordance with the present invention is shown. The bicycle lighting fixture comprises a housing 10, a reflector 20, a light source 30, and a lens 40.

The housing 10 is mountable on a bicycle, defining therein an accommodation chamber 11 adapted for accommodating the reflector 20, the light source 30, the lens 40 and power supply-related devices, such as battery module (not shown) and related electrical wires (not shown).

The light source 30 is mounted in the accommodation chamber 11 inside the housing 10, and adapted to emit light toward the reflector 20. Preferably, the light source 30 is a high performance light emitting diode that slopes downward at 45° relative to an imaginary horizontal reference line, enabling the emitted light to fully fall upon a predetermined surface of the reflector 20.

The reflector 20 is preferably configured in a rectangular shape in the front direction. Further, the reflector 20 comprises a curved reflecting surface 21 facing toward the outside of the accommodation chamber 11. The curved reflecting surface 21 is divided into a plurality of reflecting surface areas 211~214 at different elevations, namely, the first reflecting surface area 211, the second reflecting surface area 212, the third reflecting surface area 213 and the fourth reflecting surface area 214 that are disposed at different elevations in a good order in direction from top to bottom, and a terrace surface 22 between each two adjacent reflecting surface areas. These terrace surfaces 22 are disposed in a parallel manner relative to the incident light. Further, the junction between each terrace surface 22 and each adjacent reflecting surface area is a curved surface having a small curvature.

The lens 40 is mounted in the accommodation chamber 11 of the housing 10 at an outer side relative to the reflector 20 in such a manner that the space in the accommodation chamber 11 of the housing 10 between the lens 40 and the reflector 20 is enclosed, having good waterproof and dustproof effects. If necessary, the lens 40 can be configured to provide multiple refractive areas of different refractive indexes for refracting the light that is reflected by the reflector 20 to achieve the desired light condensation effect, light scattering effect, or light refraction effect.

Figure 4:
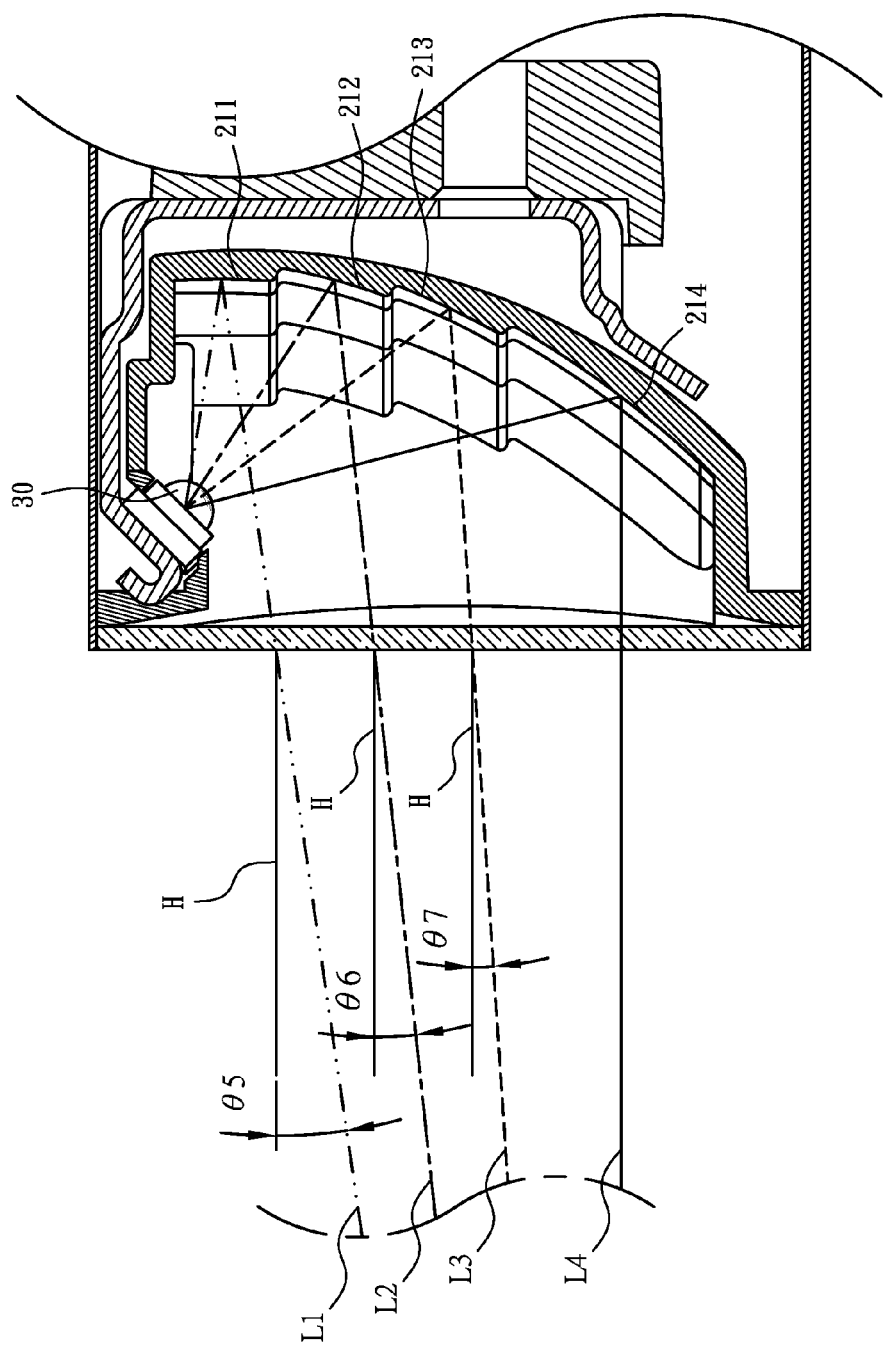
FIG. 4 is similar to FIG. 3, illustrating the light path of the bicycle lighting fixture.

Referring also to FIG. 4, when the light source 30 is switched on to emit light onto the reflecting surface areas 211~214, the lowest reflecting surface area, i.e., the fourth reflecting surface area 214 reflects the incident light into a reflected light L4 that goes in horizontal. The other reflecting surface areas 212~214 reflect the respective incident light obliquely downwardly at a respective different sloping angle relative to the imaginary horizontal reference line H. The sloping angle of the respective reflected light will be relatively larger if the position of the reflecting surface area is relatively higher. Preferably, the reflected light L1 of the first reflecting surface area 211 defines with the imaginary horizontal reference line H a contained angle θ5 of 12°; the reflected light L2 of the second reflecting surface area 212 defines with the imaginary horizontal reference line H a contained angle θ6 of 2°; the reflected light L3 of the third reflecting surface area 213 defines with the imaginary horizontal reference line H a contained angle θ7 of 1°; the reflected light L4 of the fourth reflecting surface area 214 is parallel to the imaginary horizontal reference line H. In other words, a relatively higher reflecting surface area (for example, the first reflecting surface area 211) is suitable for reflecting light onto the ground, and a relatively lower reflecting surface area (for example, the fourth reflecting surface area 214) is suitable for reflecting light onto a far place.

Figure 5:
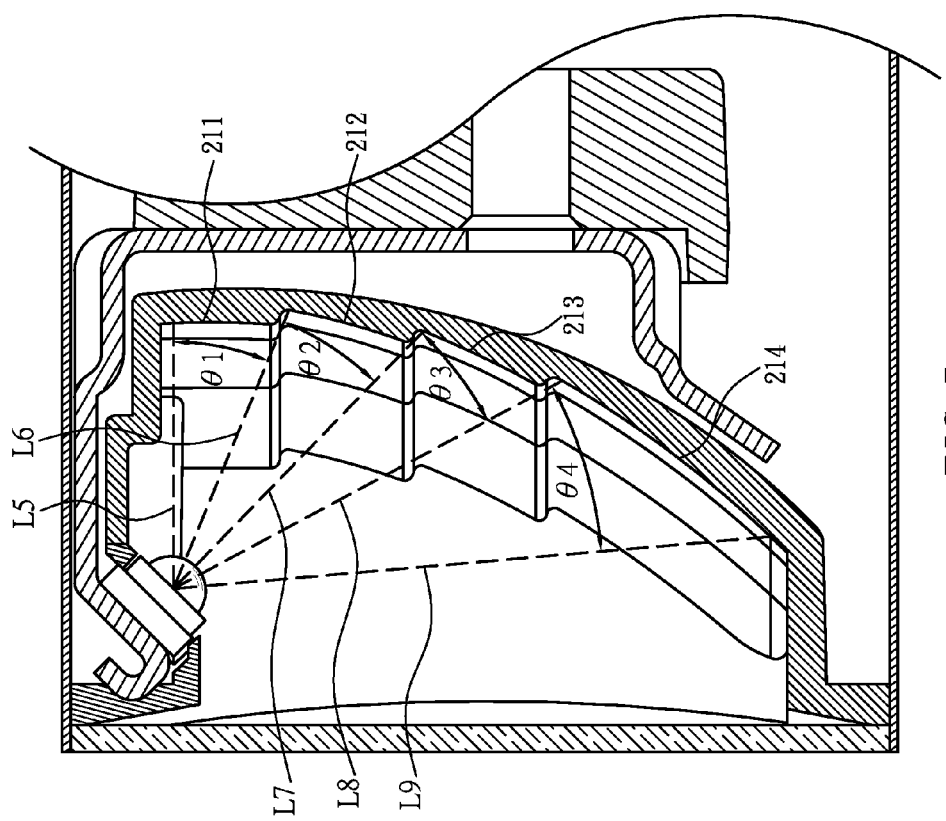
FIG. 5 is similar to FIG. 3, illustrating imaginary lines connected between the light source and the curved reflecting surface of the bicycle lighting fixture.

Referring to FIG. 5, in the direction of vertical section, imaginary lines L5~L9 are connected between a common start point at the light source 30 and respective end points at the curved reflecting surface 21 of the reflector 20. The first imaginary line L5 is connected between the common start point at the light source 30 and one respective end point at the topmost edge of the curved reflecting surface 21 of the reflector 20. The last imaginary line, i.e., the fifth imaginary line L9 is connected between the common start point at the light source 30 and one respective end point at the lowest edge of the curved reflecting surface 21 of the reflector 20. The first imaginary line L5 and the last imaginary line (fifth imaginary line) L9 define a contained angle smaller than 90°. The second imaginary line L6 is connected between the common start point at the light source 30 and one respective end point at the lowest edge of the first reflecting surface area 211 of the curved reflecting surface 21 of the reflector 20. The first imaginary line L5 and the second imaginary line L6 define a first contained angle θ1 of 20°. The third imaginary line L7 is connected between the common start point at the light source 30 and one respective end point at the lowest edge of the first reflecting surface area 212 of the curved reflecting surface 21 of the reflector 20. The second imaginary line L6 and the third imaginary line L7 define a second contained angle θ2 of 20°. The fourth imaginary line L8 is connected between the common start point at the light source 30 and one respective end point at the lowest edge of the third reflecting surface area 213 of the curved reflecting surface 21 of the reflector 20. The third imaginary line L7 and the fourth imaginary line L8 define a third contained angle θ3 of 20°. Further, the fourth imaginary line L8 and the last imaginary line (fifth imaginary line) L9 define a fourth contained angle θ4 of 25°. Therefore, the curved reflecting surface 21 has a vertical extension angle of 85° (i.e., smaller than 90°). The first reflecting surface area 211, the second reflecting surface area 212 and the third reflecting surface area 213 have the same vertical extension angle of 20°. The fourth reflecting surface area 214 has a relatively larger vertical extension angle, i.e., 25° angle, capable of providing adequate lighting on the front side.

Figure 6:
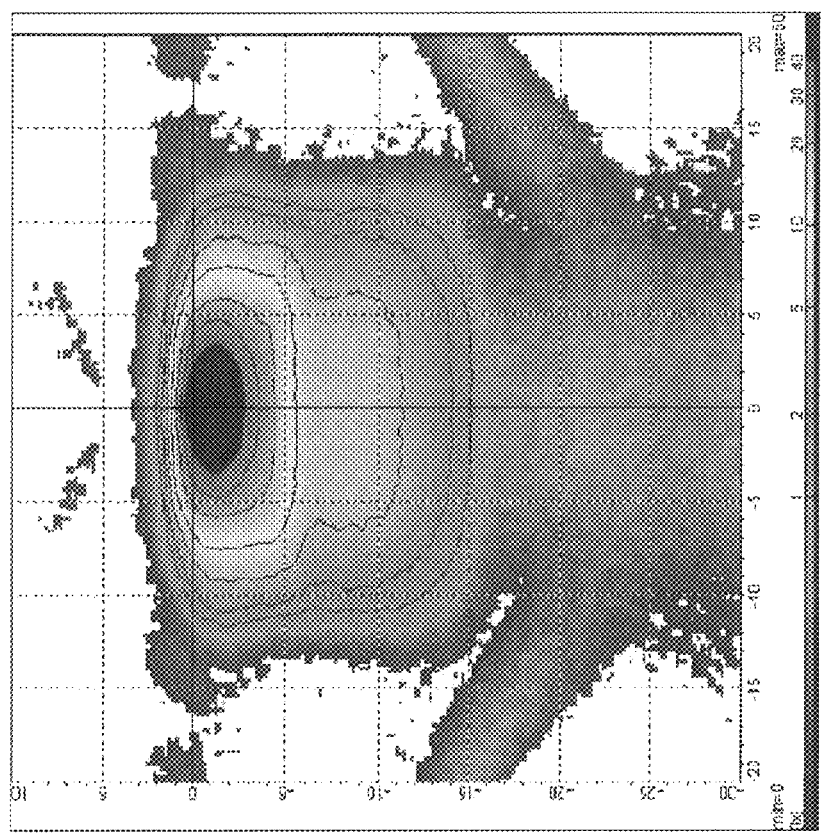
FIG. 6 is a polar luminance distribution diagram obtained from a test made, subject to StVZO TA23, on the bicycle lighting fixture in accordance with the present invention.

FIG. 6 is polar luminance distribution diagram obtained from a test made, subject to StVZO TA23, on the bicycle lighting fixture in accordance with the present invention. In the test, the light source is a 240-Lumen LED. The test data is listed in the following Table II.

TABLE II

| Unit: lx | −8° | −4° | 0° | 4° | 8° |
|---|---|---|---|---|---|
| >3.4° | 0.08 | 0.3 | 0.6 | 0.34 | 0.08 |
| 0° |  | 35.3 | 63.3 | 36.5 |  |
| −1.5° |  |  | 43.8 |  |  |
| −5° | 3.95 | 7 | 7.3 | 7 | 3.8 |

When compared Table II with Table I, it is apparent that the bicycle lighting fixture of the present invention meets the specifications of StVZO TA23.

Referring to FIG. 2 again, the bicycle lighting fixture in accordance with the present invention further comprises a pair of side reflectors 23 respectively extending from opposing left and right sides toward the outside of the accommodation chamber 11 for reflecting laterally projected light rays of the light source 30. The related reflected areas 23a of the side reflectors 23 are shown in FIG. 6, providing laterally extending auxiliary lighting.

Because the reflecting surface areas 211~214 of the curved reflecting surface 21 are of non-continuous multi-step design, the face shape design of the curved reflecting surface 21 is simple, and the reflecting surface areas 211~214 of the curved reflecting surface 21 can reflect light onto the expected area. In conclusion, the bicycle lighting fixture meets related German laws, and has an industrial value.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A bicycle lighting fixture, comprising a housing defining therein an accommodation chamber, a reflector mounted in said accommodation chamber and a light source mounted in said accommodation chamber and adapted to emit light onto said reflector, wherein said reflector comprises a curved reflecting surface facing toward the outside of said accommodation chamber, said curved reflecting surface comprising a plurality of reflecting surface areas disposed at different elevations and a terrace surface connected between each two adjacent said reflecting surface areas, wherein when said light source emits light onto said reflecting surface areas of said curved reflecting surface, said reflecting surface area at the lowest elevation reflects the light emitted by said light source in horizontal, and the other said reflecting surface areas reflect the light emitted by said light source at a respective downward slope angle, the downward slope angle of the reflected light from a relatively higher one of said reflecting surface areas being relatively larger than the reflected light from a relatively lower one of said reflecting surface areas.

2. The bicycle lighting fixture as claimed in claim 1, wherein said curved reflecting surface comprises a first reflecting surface area, a second reflecting surface area, a third reflecting surface area and a fourth reflecting surface area arranged at different elevations from top to bottom, the reflected light from said first reflecting surface area defining with said horizontal reference line a contained angle of 12°, the reflected light from said second reflecting surface area defining with said horizontal reference line a contained angle of 2°, the reflected light from said third reflecting surface area defining with said horizontal reference line a contained angle of 1°, the reflected light from said fourth reflecting surface area being parallel to said horizontal reference line.

3. The bicycle lighting fixture as claimed in claim 1, wherein first two imaginary lines are respectively defined between a common start point at said light source and a respective end point at the topmost edge and lowest edge of said curved reflecting surface, said first two imaginary lines defining a contained angle smaller than 90°.

4. The bicycle lighting fixture as claimed in claim 3, wherein said curved reflecting surface comprises a first reflecting surface area, a second reflecting surface area, a third reflecting surface area and a fourth reflecting surface area arranged at different elevations from top to bottom, the topmost edge and lowest edge of said first reflecting surface area defining with said light source a contained angle of 20°, the topmost edge and lowest edge of said second reflecting surface area defining with said light source a contained angle of 20°, the topmost edge and lowest edge of said third reflecting surface area defining with said light source a contained angle of 20°, the topmost edge and lowest edge of said fourth reflecting surface area defining with said light source a contained angle of 25°.

5. The bicycle lighting fixture as claimed in claim 1, wherein each said terrace surface is disposed in a parallel manner relative to the respective incident light from said light source.

6. The bicycle lighting fixture as claimed in claim 5, wherein the junction between each said terrace surface and each adjacent said reflecting surface area is a curved surface having a small curvature.

7. The bicycle lighting fixture as claimed in claim 1, wherein said light source slopes downwardly at 45° relative to a horizontal reference line.

8. The bicycle lighting fixture as claimed in claim 1, wherein said reflector has a substantially rectangular shape on a front side thereof.

9. The bicycle lighting fixture as claimed in claim 1, further comprising two side reflectors respectively extending from opposing left and right sides of said curved reflecting surface toward the outside of said accommodation chamber.

* * * * *